(12) United States Patent
Süßenbach

(10) Patent No.: US 7,422,181 B2
(45) Date of Patent: Sep. 9, 2008

(54) JOINING ASSEMBLY FOR FIXING A TUBE AT A HOLDER

(75) Inventor: Rainer Süßenbach, Steinhagen (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 384 days.

(21) Appl. No.: 11/125,778

(22) Filed: May 10, 2005

(65) Prior Publication Data

US 2005/0264013 A1  Dec. 1, 2005

(30) Foreign Application Priority Data

May 26, 2004  (DE)  .................. 20 2004 008 388

(51) Int. Cl.
  *F16L 5/00* (2006.01)
(52) U.S. Cl. ................... 248/56; 248/74.1; 248/74.4; 174/664
(58) Field of Classification Search ............. 248/689, 248/27.3, 56, 49, 74.4, 212, 74.1, 74.2, 230.7, 248/231.81; 285/921; 174/650, 661, 663, 174/664, 669, 68.1, 68.3, 135
See application file for complete search history.

(56) References Cited

U.S. PATENT DOCUMENTS

| | | | | |
|---|---|---|---|---|
| 1,721,119 A | * | 7/1929 | Houghton | ............. 285/217 |
| 1,835,155 A | * | 12/1931 | Harbert | ............. 248/56 |
| 2,365,785 A | * | 12/1944 | Tinnerman | ............. 248/56 |
| 2,954,248 A | * | 9/1960 | Brickman | ............. 74/502.4 |
| 3,069,189 A | * | 12/1962 | Hollaender | ............. 403/385 |
| 3,161,906 A | * | 12/1964 | Yarm | ............. 16/2.1 |
| 3,584,923 A | | 6/1971 | Goossens | |
| 4,006,874 A | * | 2/1977 | McGee | ............. 248/74.3 |
| 4,226,164 A | * | 10/1980 | Carter | ............. 411/433 |
| 4,407,042 A | * | 10/1983 | Schramme et al. | ............. 16/2.1 |
| 4,601,448 A | | 7/1986 | Miyazaki et al. | |
| 4,646,995 A | * | 3/1987 | Matsui et al. | ............. 248/56 |
| 4,655,422 A | * | 4/1987 | Kelsall | ............. 248/56 |
| 5,161,428 A | * | 11/1992 | Petruccello | ............. 74/502.4 |
| 5,261,633 A | | 11/1993 | Mastro | |
| 5,406,032 A | * | 4/1995 | Clayton et al. | ............. 174/151 |
| 5,460,247 A | | 10/1995 | Fouts | |
| 5,545,854 A | * | 8/1996 | Ishida | ............. 174/153 G |
| 5,639,993 A | * | 6/1997 | Ideno et al. | ............. 174/153 G |
| 5,908,180 A | * | 6/1999 | Daoud | ............. 248/56 |
| 6,241,199 B1 | * | 6/2001 | Ismert | ............. 248/56 |
| 6,627,817 B1 | * | 9/2003 | Kortenbach | ............. 174/74 R |
| 6,908,123 B2 | * | 6/2005 | Le | ............. 285/402 |

FOREIGN PATENT DOCUMENTS

DE  30 04 421 A1  9/1981
DE  3731149 A1  3/1989

(Continued)

*Primary Examiner*—Brian Glessner
*Assistant Examiner*—Bradley H Duckworth
(74) *Attorney, Agent, or Firm*—Seyfarth Shaw LLP

(57) ABSTRACT

A joining assembly for fixing a flexible tube at a plate shaped holder. The joining assembly comprises first and second sleeve members made of plastic material and adapted to be joined by snap-lock means so as to form a closed sleeve clampingly receiving the flexible tube, and a bracket made of plastic material and adapted to engage the closed sleeve so as to fix it in a hole of the holder.

15 Claims, 2 Drawing Sheets

FOREIGN PATENT DOCUMENTS

| | | |
|---|---|---|
| DE | 3431 466 C2 | 4/1989 |
| DE | 199 44 600 A1 | 4/2001 |
| EP | 0666443 A1 | 8/1995 |
| FR | 2683608 | 11/1991 |
| JP | 2004019817 A | 1/2004 |

* cited by examiner

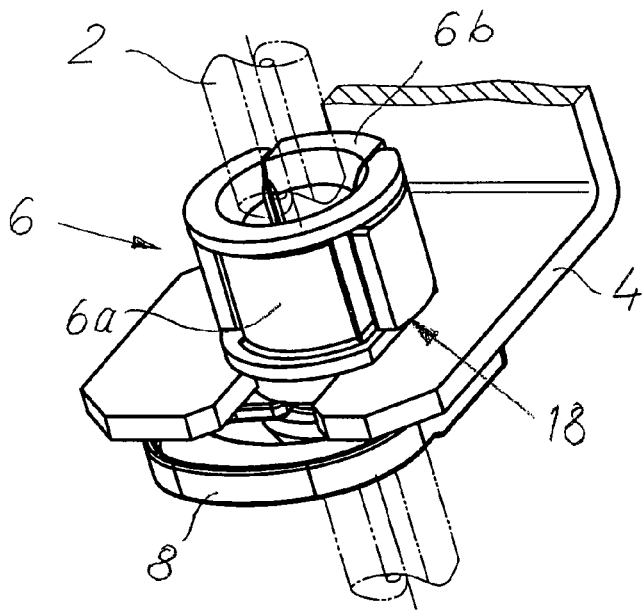
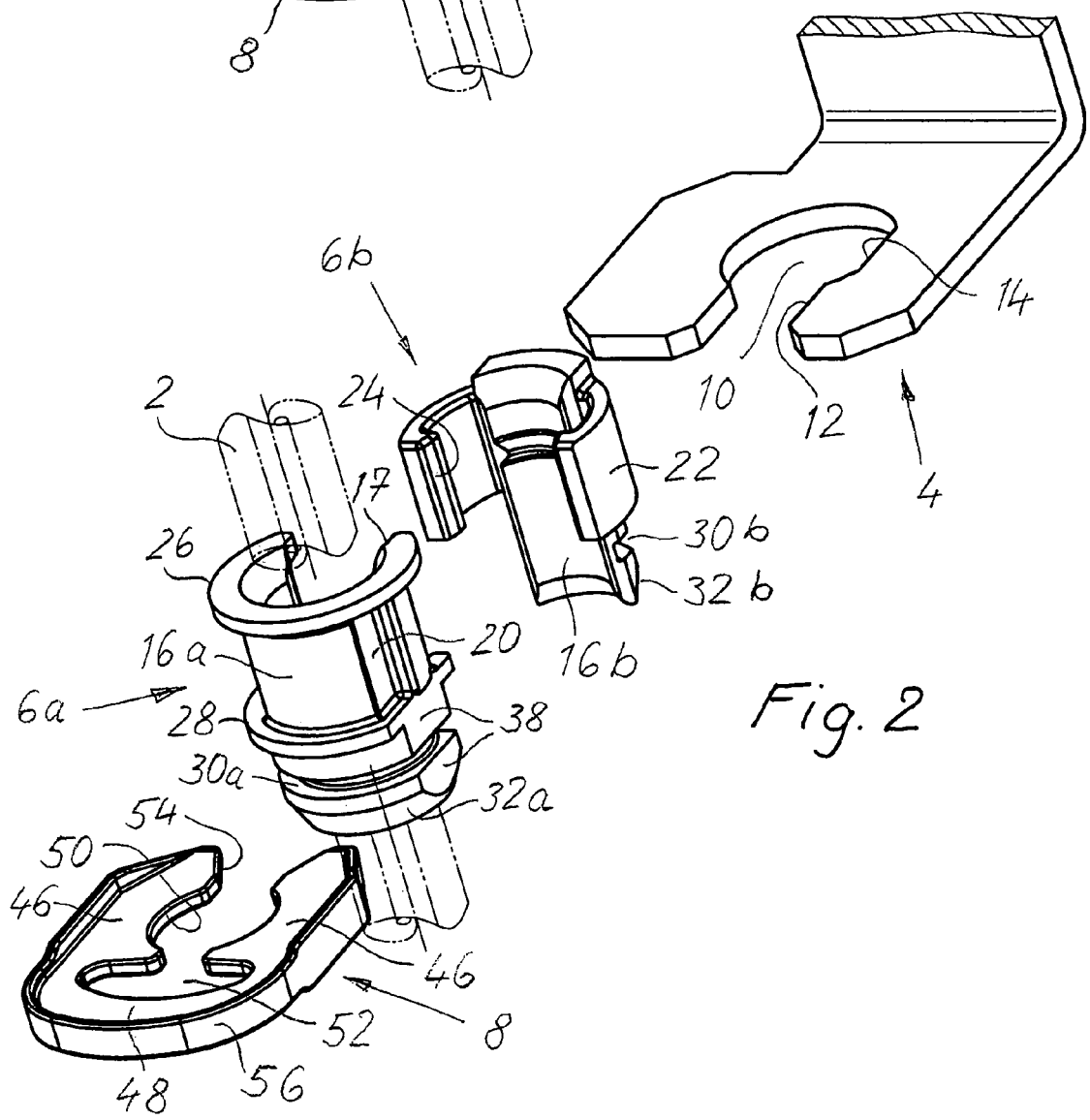

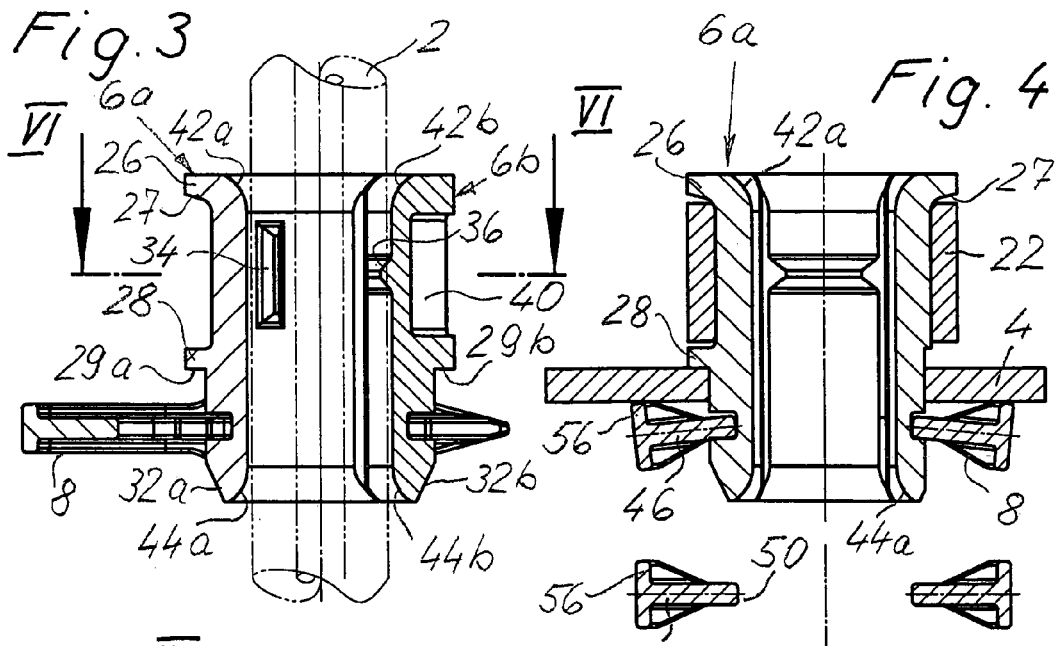
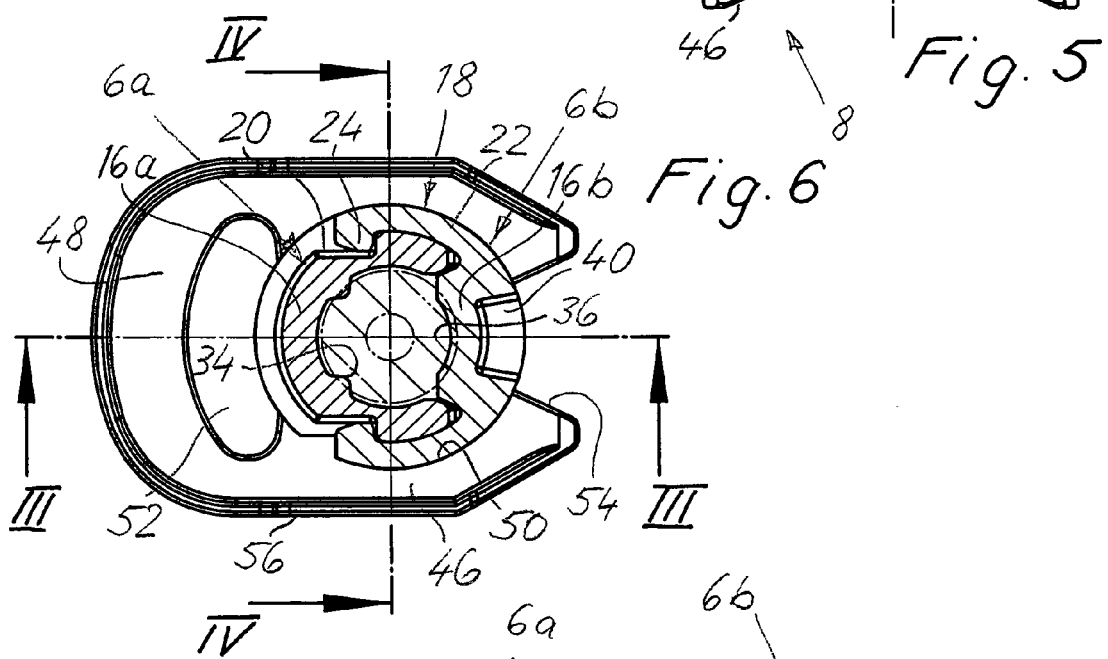
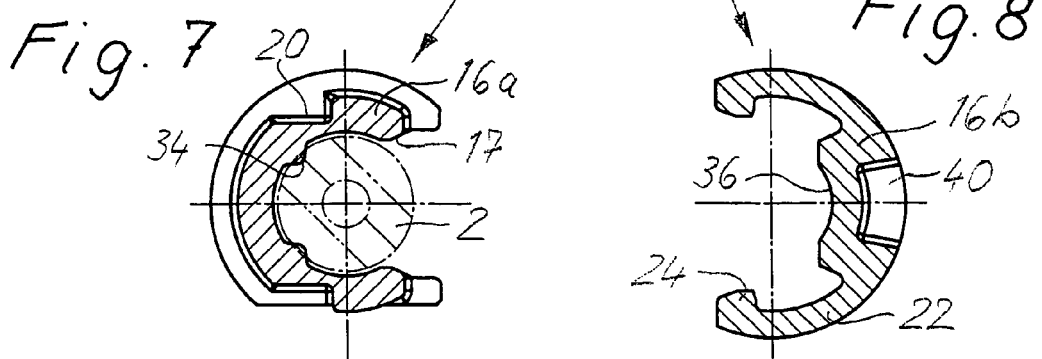

JOINING ASSEMBLY FOR FIXING A TUBE AT A HOLDER

BACKGROUND OF THE INVENTION

The present invention relates to a joining assembly for fixing a tube at a holder, in particular for fixing a brake fluid tube at a holder fixedly mounted to a vehicle.

Such brake fluid tube connectors are mounted for example at the vehicle body adjacent to a brake cylinder for a front wheel of a vehicle and are adapted in particular to provide tensional stress relief of the flexible brake fluid tube which extends to the brake cylinder and performs respective movements as a result of steering movements of the front wheel. In the prior art there has become known such a joining assembly which comprises a steel sleeve and a steel bracket or clamp which fix the brake fluid tube at a plate shaped holder of the vehicle body. For mounting the joining assembly to the vehicle body a portion of the brake fluid tube is inserted into the bore of the steel sleeve and thereafter is deformed in a folding area such that internal annular cutting edges of the sleeve penetrate into the outer surface of the brake fluid tube so as to be interlocked therewith. Due to such "crimping" operation, the brake fluid tube is held stationary both circumferentially and axially. For mounting this assembly to the holder the assembly is inserted into a hole of the plate-shaped holder and secured to the holder by the steel bracket.

This joining assembly of the prior art suffers from the drawbacks that the steel sleeve is a complex and expensive part requiring turning and milling operations, that the surface protection of the involved members may be damaged by the "crimping" operation so as to cause corrosion problems, that the assembling operation which requires insertion of the brake fluid tube into the steel sleeve and a following "crimping" operation is relatively complex and expensive, and that the steel members are of relatively high weight.

SUMMARY OF THE INVENTION

It is an object of the present invention to provide a joining assembly for fixing a tube at a holder, which may be made totally of plastic material and which allows for extremely simple and cost effective manufacture and assembly thereof.

In the joining assembly of the present invention the sleeve which clampingly receives the tube is divided in two, i.e. it consists of a pair of sleeve members both of which are made of plastic material. The two sleeve members are adapted to be connected to each other by snap-lock means so as to form a closed sleeve. The bracket or clamp is also made of plastic material and is adapted to engage the closed sleeve so as to fix the closed sleeve in a hole of the plate-shaped holder.

Accordingly, all of the total joining assembly is made of plastic material so that corrosion problems are avoided. Furthermore, the use of plastic material allows substantially to reduce the weight of the joining assembly. The two sleeve members and the bracket may be readily manufactured by injection molding. Machining operations such as turning and milling are not required. Furthermore, dividing the sleeve into a pair of sleeve members avoids the requirement of axially inserting the tube into the sleeve; rather, the tube may be laterally inserted into one of the sleeve members before the two sleeve members are snappingly connected to each other. This manner of assembling the joining assembly is particularly suited for automatic operations. As a result processing in the assembly line is significantly simplified. Furthermore, the fact that the tube can be inserted into the sleeve by lateral movement provides for mounting flexibility so that the joining assembly can be adapted to varying dimensions and varying positions of the sleeve relative to the tube. Finally a sleeve "crimping" operation as in the prior art is not required.

The preferred field of application of the joining assembly of the present invention is the fixing of flexible brake fluid tubes or hoses. However, it should be noted that the joining assembly of the present invention can be used in any other field where a tube or hose is to be fixed to a holder for tensional stress relief.

BRIEF DESCRIPTION OF THE DRAWINGS

A preferred embodiment of the present invention will be explained with reference to the accompanying drawings wherein:

FIG. 1 is a perspective view of a joining assembly in accordance with the present invention in its final mounted condition;

FIG. 2 is a perspective explosive view of the joining assembly of FIG. 1;

FIG. 3 is a cross-sectional view, in the direction of arrows III-III in FIG. 6, of the joining assembly of FIG. 1 without the holder;

FIG. 4 is a cross-sectional view, in the direction of arrows IV-IV in FIG. 6, of the joining assembly of FIG. 1 with the holder;

FIG. 5 is a sectional view, in the direction of arrows IV-IV in FIG. 6, of the bracket alone without being deformed;

FIG. 6 is a cross-sectional view, in the direction of arrows VI-VI in FIG. 3; of the joining assembly without the holder;

FIG. 7 is a cross-sectional view similar to FIG. 6 of one of the sleeve members alone;

FIG. 8 is a cross-sectional view similar to FIG. 6 of the other sleeve member alone.

DETAILED DESCRIPTION OF THE PREFERRED EMBODIMENT

The joining assembly shown in FIGS. 1 and 2 is adapted to fix a flexible brake fluid tube or hose 2 (indicated by dash dotted lines) to a holder 4 which is mounted to a vehicle body (not shown) of a vehicle adjacent to a brake cylinder (not shown) of a front wheel so that the flexible tube or hose 2 will be deflected by steering movements of the front wheel. The joining assembly provides for tensional stress relief of the tube 2 which is held stationary, by the joining assembly, to the holder 4 both circumferentially as well as axially and radially as will be explained in more detail below.

The joining assembly comprises a sleeve 6 which consists of a pair of connectable sleeve members 6a, 6b, and a bracket or clamp 8. All of these members are made of plastic material. The sleeve 6 consisting of the two sleeve members 6a, 6b is fixed at the holder 4 by the bracket 8 as will be explained in more detail below.

The holder 4 is a plate shaped member having a circular hole 10 merging into a lateral opening 12 and having a flat surface 14.

For description of the sleeve members 6a, 6b and the bracket 8 reference will be made additionally to FIGS. 3 to 8.

The sleeve members 6a and 6b each comprise a substantially part cylindrical shell body 16a and, respectively, 16b (FIGS. 6 to 8). The shell body 16a extends circumferentially for more than 180°, and the shell body 16b extends circumferentially for less than 180° such that the two shell bodies form a closed shell body extending circumferentially for 360°. In the embodiment as shown, the shell body 16a extends circumferentially for about 270° (see in particular FIGS. 6, 7). The shell body 16a has a lateral opening 17 of a width which is slightly smaller than the diameter of the tube 2 so as to allow for the tube 2 to be inserted laterally into the shell body 16a through the lateral opening 17 while being radially slightly deformed. The shell body 16b extends circumferentially for about 90° (FIGS. 6, 8) so that it completely closes the lateral opening 17 of the shell body 16a when the sleeve 6 is closed.

The two sleeve members 6a and 6b can be connected to each other by snap-lock means 18. The snap-lock means 18 comprise, on the one hand, a pair of recesses 20 in the outer surface of the shell body 16a (see in particular FIGS. 6 and 7) and, on the other hand, a pair of spring arms 22 which are integral with the shell body 16b and extend therefrom circumferentially (see in particular FIGS. 6 and 8). When the sleeve 6 is closed, the spring arms 22 extend partially about the shell body 16a of the sleeve member 6a. The free ends of the spring arms 22 are provided with projections 24 which snappingly engage into the recesses 20 of the shell body 16a of the sleeve member 6a.

The sleeve member 6a has axially spaced flanges 26, 28 (FIGS. 2 to 4) which limit and define the axial position of the spring arms 22 while the two sleeve members 6a, 6b are being connected to each other. The flange 26 has one of its sides provided with a chamfer 27 which assists in centering the spring arms 22 within the gap between the two flanges 26 and 28 when the two sleeve members 6a, 6b are being connected to each other.

Furthermore, the two sleeve members 6a and 6b each are provided with a partial annular groove 30a and, respectively, 30b (FIG. 2) which will form, when the sleeve 6 is closed, a full annular groove for snappingly receiving the bracket 8. Furthermore the sleeve members 6a and 6b each have one axial end provided with a chamfer 32a and, respectively, 32b which, when the sleeve 6 is closed, form a conical chamfer facilitating insertion of the sleeve 6 into the hole 10 of the holder 4.

As shown in particular in FIGS. 3, 6 and 7, the sleeve member 6a has a pair of axially extending ribs 34 which project inwards from the inner surface of the shell body 16a and have tapered axial ends. The sleeve member 6b has a transversely extending rib 36 which projects inwards from the inner side of the shell body 16b and has tapered opposite ends. The ribs 34 and 36 are adapted to fix the tube 2 both circumferentially and axially as will be explained in more detail below.

The sleeve member 6a has a lower portion (FIG. 2) provided with a flat surface 38 which engages the flat surface 14 in the hole 10 of the holder 4 for positioning the sleeve 6 in its final mounting condition.

The sleeve member 6b has an outer side provided with a cavity 40 which is provided, on the one hand, for material serving purposes and, on the other hand, to provide increased resilience and elasticity of the sleeve member 6b and its spring arms 22.

Both sleeve members 6a, 6b have its opposite axial ends provided with radiused inner edges 42a, 42b and 44a, 44b (FIGS. 3 and 4) which allow the tube to be freely deflected.

The bracket 8 comprises a plate-like section of general U-shape. More particularly, the bracket 8 comprises a pairs of legs 46 which are connected to each other by an arcuate end portion 48. The two legs 46 have circular arc shaped inner edges 50 facing each other. The circular arc shaped inner edges 50 merge, towards the open slide of the bracket 8, into inclined surfaces 54 which facilitate mounting the bracket 8 upon the sleeve 6.

The end portion 48 has, adjacent to the circular arc shaped inner edges 50, a transversely extending elongated aperture 52 which is of oval or half moon shape. The transverse aperture 52 of the bracket 8 is provided to make the legs 46 resiliently deflectable both in radial and axial directions. The resilient properties in the radial direction allow the legs 46 to be expanded while the resilient properties in the axial direction allow the legs 46 to be laterally deflected with respect to the end portion 48 (see FIG. 4) so as to exert an axial biasing force upon the sleeve 6 when it is in its final mounting condition.

The bracket 8 has a peripheral outer edge 46 which, together with the plate shaped section of bracket 8, is of a cross section in the shape of a T. The T-shaped peripheral outer edge 56 enforces the strength of the bracket when performing its biasing function and provides for some supporting action when the bracket 8 is axially loaded (FIG. 4). The bracket 8 is of symmetrical shape with respect to its central plane so that it can be mounted upon the sleeve 6 in the position shown in FIG. 2 or in a reverse position.

As mentioned already, both the sleeve members 6a, 6b and the bracket 8 are made of plastic material. Preferably they are made from a technical thermoplastic material modified to be impact resistant and enforced by fillers. The sleeve members 6a, 6b may be made for example from a technical thermoplastic material of the PA 66+PA6 type modified to be impact resistant and enforced by glass fibres; this type of material has the desired resiliency and strength properties and is brake fluid (oil) resistant. The bracket 8 can be made for example from a PA6 type material filled by glass fibres for about 50%. It should be noted, however, that other plastic materials can be used depending on the intended application.

In the following, mounting of the joining assembly will be described; the joining assembly is particularly suited for automatic mounting by an assembling mechanism (not shown).

Initially, the flexible tube or hose 2 which has been cut into suitable lengths is laterally moved into the interior of the sleeve member 6a through the lateral opening 17. As a result thereof the tube 2 is slightly radially deformed so that the tube 2 is retained within the shell body 16a of the sleeve member 6a under a slight biasing tension. Thereafter the sleeve member 6b is connected to the sleeve member 6a by sliding the spring arms 22 about the sleeve member 6a until the projections 24 of the spring arms 22 snappingly engage into the recesses 20 of the sleeve member 6a. During this operation the flanges 26 and 28 guide and axially position the spring arms 22.

When the two sleeve members 6a and 6b are snappingly engaged into each other, the axially extending ribs 34 of the sleeve member 6a and the transversely extending rib 36 of the sleeve member 6b penetrate into the surface of the tube 2 which is made of rubber or the like, with the tube 2 not being subjected to stress beyond its elasticity range. The number, shape and dimensions of the ribs 34, 36 are selected such that the ribs secure the tube 2 both in circumferential and axial directions. It should be understood that the number, arrangement, shape and dimensions of the ribs 34, 36 can be selected otherwise depending on the intended use thereof. Since the ribs 34, 36 are made of plastic material and therefore provide, along with the tube, for a plastic/rubber material combination and since the ends of the ribs do not have sharp edges, the risk of damaging the tube 2 is avoided.

The resulting unit of the tube 2 and the closed sleeve 6 will now be axially inserted into the hole 10 of the holder 4 after the tube 2 has been inserted into the hole 10 of the holder 4 through the lateral opening 12. During this operation the flat surface 14 of the holder 4 and the flat surface 38 of the sleeve member 6 ensure that the closed sleeve 6 will be in a specific circumferential orientation within the hole 10 of the holder 4. The bracket 8 is then mounted upon the closed sleeve 6 such that the legs 46 of the bracket 8 have their circular arc shaped inner edges 50 snappingly engage into the annular groove 30a, 30b of the closed sleeve 6. Expansion of the legs 46 required to this end is facilitated by the transverse aperture 52 of the bracket 8 which makes the legs 46 resilient and flexible in the radial direction.

As already mentioned, the transverse aperture 52 makes the legs 46 resilient and flexible not only in the radial direction but also in the axial direction (with respect to the tube and joining assembly. Therefore, when the bracket 8 has been mounted upon the sleeve 6 and engages one side of the holder 4, it exerts an axial biasing force upon the sleeve members 6a, 6b. As a result shoulders 29a, 29b provided at the sleeve members 6a, 6b (FIG. 3) are urged against the other side of the holder 4. The shoulders 29a, 29b are formed, on the one hand, by one face of the flange 28 of the sleeve member 6a and, on the other side, by a reduced cross section of the shell body 16b of the sleeve member 6b.

Accordingly, the bracket 8 clamps so to say the sleeve members 6a, 6b against the holder 4 via the shoulders 29a, 29b whereby the closed sleeve 6 is axially fixed within the hole 10 of the holder 4. As a result the legs 46 of the bracket 8 are axially deflected as shown in FIG. 4. FIG. 5 shows the legs 46 before they are axially deflected.

The joining assembly is now in its final mounting condition providing for tensional stress relief of the tube both in circumferential and axial directions.

Disassembling the joining assembly is possible by performing the described steps in the reverse order. For releasing the tube 2 from the tube 6, the spring arms 22 of the sleeve member 6 are urged outwards by a tool (not shown) so that the projections 24 are removed from the recesses 20 and the sleeve member 6b can be withdrawn from the sleeve member 6a.

I claim:

1. A joining assembly for fixing a tube at a plate-shaped holder, the joining assembly comprising:
    a tube having a central axis and an outer surface,
    a plate-shaped holder provided with a hole,
    first and second sleeve members made of plastic material and comprising snap-lock means for snappingly joining said first and second sleeve members so as to form a closed sleeve clampingly engaging said outer surface of the tube, and
    a bracket made of plastic material and adapted to engage said closed sleeve so as to fix said closed sleeve in said hole of said plate-shaped holder, wherein
    said first sleeve member comprises a first shell body extending circumferentially for more than 180°,
    said second sleeve member comprises a second shell body extending circumferentially for less than 180°,
    said snap-lock means comprise a pair of spring arms integrally connected to said second shell body and extending therefrom circumferentially in opposite directions partially about said first shell body, and
    said first shell body has an outer surface provided with a pair of recesses, and said spring arms have free ends provided with radial projections matingly shaped with respect to said recesses for snappingly engaging into said recesses for snappingly joining said first and second sleeve members, said snap-lock means consisting exclusively of said pair of spring arms and said pair of recesses,
    wherein said first shell body has a lateral opening said lateral opening being of a width slightly smaller than an outer diameter of the tube so as to allow for the tube to be laterally inserted into said first shell body through said lateral opening while the tube is slightly deformed.

2. A joining assembly as defined in claim 1 wherein at least one of said first and second sleeve members has an inner surface provided with at least one axially extending rib which projects into said outer a surface of the tube when said closed sleeve clampingly receives the tube.

3. A joining assembly as defined in claim 1 wherein at least one of said first and second sleeve members has an inner surface provided with at least one transversely extending rib which projects into said outer surface of the tube when said closed sleeve clampingly receives the tube.

4. A joining assembly as defined in claim 1 wherein said second shell body completely closes said lateral opening of said first shell body.

5. A joining assembly as defined in claim 1 wherein said first sleeve member has axially spaced flanges extending circumferentially for axially positioning said spring arms.

6. A joining assembly as defined in claim 1 wherein said first and second sleeve members each have opposite axial ends provided with radiused inner edges so as to allow for said tube to be deflected in any direction.

7. A joining assembly as defined in claim 1 wherein said bracket has a plate-like section comprising a pair of legs interconnected by an end portion and having inner edges of circular arc shape, and said first and second sleeve members form an annular groove snappingly receiving said pair of legs of said bracket when said bracket is snappingly connected to said closed sleeve.

8. A joining assembly of claim 7 wherein said first and second sleeve members each have a shoulder which is axially spaced to said annular groove such that said bracket engages one side of said holder and resiliently urges said shoulders of said first and second sleeve members against an opposite side of said holder when the joining assembly is in a final mounting position.

9. A joining assembly as defined in claim 7 wherein said end portion of said bracket is provided, adjacent said inner edges of said legs, with a transversely extending elongated aperture so as to make said legs resiliently deflectable both in axial and radial directions.

10. A joining assembly as defined in claim 7 wherein said bracket has an external edge of a T-shaped cross section.

11. A joining assembly as defined in claim 7 wherein said bracket is symmetrical with respect to a central plane so as to be adapted to be mounted a first position and a reverse second position.

12. A joining assembly as defined in claim 1 wherein said first and second sleeve members each have an axial end provided with a chamfer for facilitating axial insertion of said closed sleeve into said hole of said holder.

13. A joining assembly as defined in claim 1 wherein said first and second sleeve members and said bracket are made of thermoplastic materials which are modified so as to be impact resistant and enforced by fillers.

14. A joining assembly as defined in claim 1 wherein said hole of said plate-shaped holder is defined by a wall which is of part circular shape except for a flat wall surface, and at least one of said first and second sleeve members has an outer surface of part circular shape except for a flat outer surface matingly shaped with respect to said flat wall surface of the hole of said holder so as to position said closed sleeve in said holder in a predetermined circumferential position.

15. A joining assembly for fixing a tube at a plate-shaped holder, the joining assembly comprising:
- a tube having a central axis and an outer surface,
- a plate-shaped holder provided with a hole,
- first and second sleeve members made of plastic material and comprising snap-lock means for snappingly joining said first and second sleeve members so as to form a closed sleeve clampingly engaging said outer surface of the tube, and
- a bracket made of plastic material and adapted to engage said closed sleeve so as to fix said closed sleeve in said hole of said plate-shaped holder, wherein
- said first sleeve member comprises a first shell body extending circumferentially for more than 180°,
- said second sleeve member comprises a second shell body extending circumferentially for less than 180°,
- said snap-lock means comprise a pair of spring arms integrally connected to said second shell body and extending therefrom circumferentially in opposite directions partially about said first shell body, and
- said first shell body has an outer surface provided with a pair of recesses, and said spring arms have free ends provided with radial projections matingly shaped with respect to said recesses for snappingly engaging into said recesses for snappingly joining said first and second sleeve members, said snap-lock means consisting exclusively of said pair of spring arms and said pair of recesses, wherein the outer surface of said tube is of cylindrical shape, and said first and second shell bodies are each of substantially part cylindrical shape so that said closed shell has an internal surface of substantially cylindrical shape in conformity with the cylindrical shape of said outer surface of said tube.

* * * * *